United States Patent [19]

Brew

[11] Patent Number: 4,888,233

[45] Date of Patent: Dec. 19, 1989

[54] FIRE RESISTANT COMPOSITE MATERIALS

[75] Inventor: Allan T. Brew, Warrington, United Kingdom

[73] Assignee: Imperial Chemical Industries PLC, London, England

[21] Appl. No.: 165,240

[22] Filed: Mar. 7, 1988

[30] Foreign Application Priority Data

Mar. 11, 1987 [GB] United Kingdom ............... 8705804

[51] Int. Cl.$^4$ ............................................. B32B 1/00
[52] U.S. Cl. .................................. 428/220; 428/921; 428/446; 106/18.12; 427/372.2
[58] Field of Search ................. 428/921, 446, 220; 106/18.12; 427/372.2

[56] References Cited

U.S. PATENT DOCUMENTS 4,476,181 10/1984 Briggs et al. ..................... 428/457
4,592,947 6/1986 Hunter et al. .................. 428/425.6

FOREIGN PATENT DOCUMENTS 1016385 1/1966 United Kingdom .
1119305 7/1968 United Kingdom .
1585104 2/1981 United Kingdom .
1593382 7/1981 United Kingdom .

Primary Examiner—Edith Buffalow
Attorney, Agent, or Firm—Cushman, Darby & Cushman

[57] ABSTRACT

A fire-resistant and heat-resistant composite material comprising a polymeric material substrate having thereon a coating comprising lamellae of chemically delaminated vermiculite and a copolymer of ethylene with a vinyl monomer.

12 Claims, No Drawings

FIRE RESISTANT COMPOSITE MATERIALS

This invention relates to fire-resistant composite materials and particularly to fire-resistant composite materials comprising a coating of chemically delaminated vermiculite on a polymeric substrate such as a film.

The insides of aircraft, ships and may buildings are clad with panels having a decorative facing of a polymeric material such as polyvinylidine fluoride or another halogen-containing polymer. These decorative facings afford a high degree of fire-resistance to the panels but suffer from the disadvantage that when exposed to fire or to a high level of heat radiation they evolve toxic gases/smoke which can be as great a hazard as the fire itself. There is a need for decorative facing materials which are free from halogen and which do not evolve toxic gases/smoke in a fire.

There are a large number of halogen-free, organic polymeric materials which are candidates for use as decorative facings. However, halogen-free polymers tend to be flammable and unable to resist high levels of heat radiation so that in practice they have to be protected against fire and/or high temperature radiation. Hitherto, no satisfactory solution has been found to the problem of using halogen-free organic polymers as fire-resistant and heat resistant facings for combustible substrates.

It has been proposed in our EPA 44162 A2 to upgrade substrates that are flammable so as to render them fire-resistant, by coating the substrates with a layer of lamellae of chemically delaminated vermiculite in which substantially all of the lamellae are of maximum dimension below 50 microns. Amongst the substrates which can be upgraded in this way are a variety of polymers and plastics in the form of sheets, films and foams. We have found, however, that whilst a significant improvement is achieved in upgrading the fire-resistance of substrates such as polymers/plastics by coating them with chemically delaminated vermiculite, the resulting composites still leave something to be desired. In particular, the coating tends to be inadequately adhered to the substrate and is susceptible to scratching and dusting or flaking off to leave exposed areas of the substrate which are not adequately protected.

It is further described in EPA 44162 A2 that the coating of the chemically delaminated vermiculite may contain additional materials including soluble polymers such as polyvinyl alcohol and polyacrylates. We have found that inclusion of a soluble polymer as in EPA 44162 A2 in the coatings improves the adhesion of the coating and the resistance of the coating to scratching and dusting or flaking off, but the coating still leaves something to be desired in respect of the fire-resistance afforded to the substrate.

The present invention is based on the discovery that coating polymeric substrates with a chemically delaminated vermiculite composition containing a copolymer of ethylene with a vinyl monomer such as vinyl acetate affords a composite material of very high fire-resistance and heat-resistance.

According to the present invention there is provided a fire-resistant and heat-resistant composite material comprising a polymeric material substrate having thereon a coating comprising lamellae of chemically delaminated vermiculite and a copolymer of ethylene with a vinyl monomer.

In a preferred embodiment of the composite material according to the invention, the composite material comprises a layer of a copolymer of ethylene with a vinyl monomer applied as a primer coating to the polymeric material substrate prior to application of the coating comprising chemically delaminated vermiculite and ethylene copolymer.

The coating applied to the polymeric substrate comprises a major proportion and preferably at least 70% by weight of the coating composition. In addition to the copolymer of ethylene with a vinyl monomer, the coating composition may include other additives such as surfactant wetting agents to enhance wetting of the substrate with the composition and defoaming agents to avoid frothing of the composition leading to bubble imperfections in the resulting coatings. If present, such other additives will normally be in an amount of less than about 1% by weight based on the composition, typically about 0.5% by weight in the case of defoaming agents and about 0.2 to 0.3% by weight in the case of surfactant wetting agents.

The amount of the copolymer of the ethylene with a vinyl monomer in the composition may vary within a wide range but will usually be at least 2% by weight and not more than about 30% by weight of the solids in the coating composition. Typically and as a guide only, the amount of the copolymer will be from about 10% to about 25% by weight, say about 20% by weight, the amount of the copolymer may depend to some extent upon whether a primer coat of the copolymer is applied to the polymeric substrate; in general the amount of the copolymer in the coating composition can be lower if a primer coating is employed than if a primer coating is not employed.

The copolymer of ethylene with a vinyl monomer may be, for example, an ethylene/vinylacetate copolymer. The coating composition will normally be a suspension of vermiculite lamellae in water or another aqueous medium and ethylene/vinyl acetate copolymers are available as dispersions in water and so are readily incorporated in the aqueous vermiculite suspension.

In making the composite materials according to the invention, a coating composition comprising vermiculite lamellae and a copolymer of ethylene with a vinyl monomer is applied over the surface of the polymeric substrate and the liquid phase of the coating composition is removed. The liquid phase will normally be water so that the coating is dried at room temperature or by heating at a temperature up to 100° C. In practice we prefer to avoid high temperatures since rapid evolution of liquid (water) may result in bubble imperfections in the coating; we prefer to allow the liquid (water) to evaporate from the coating at room temperature or at least at a temperature below about 40° C.

In the preferred embodiment of the invention, the polymeric substrate is provided with a primer coating prior to application of the coating comprising vermiculite lamellae. In this case the preferred primer coating comprises a copolymer of ethylene with a vinyl monomer and in particular preferably is the same copolymer as is used in the vermiculite coating. An especially preferred copolymer is one of ethylene with vinyl acetate. After application to the substrate, the primer coating will usually be dried prior to application of the vermiculite outer coating. As in the case of the vermiculite coating, the primer coating can be dried at any temperature up to about 100° C. but is preferably allowed to dry at room temperature.

The amount of the primer coating applied to the polymeric substrate will usually be just sufficient to coat the surface of the substrate completely with a very thin film of the copolymer. Primer coatings of about 1 to 5 g/m$^2$, say 3 g/m$^2$, have been found to be adequate although thicker primer coatings may be employed if desired. The amount of the vermiculite outer coating applied to the substrate (whether or not a primer coating is employed) may vary within wide limits but usually will be such as to provide a coating of thickness about 20 microns, typical loadings being from about 20 g to about 30 g/m$^2$, say 25 g/m$^2$, However, thinner or thicker coating may be applied if desired depending for instance upon the intended fire duty or heat duty of the coated material and in particular thick coatings may be provided by applying more than one layer of the coating composition.

The coating composition comprising vermiculite lamellae will usually be an aqueous composition since the chemically delamination of vermiculite is usually carried our in water to provide an aqueous suspension (or slurry) of the resulting vermiculite lamellae. Whilst it is possible to isolate the vermiculite lamellae and re-suspend them in a carrier liquid other than water we have found that water is the preferred carrier liquid since vermiculite lamellae adhere together and are film-forming particles when deposited from water.

Chemical delamination of vermiculite to yield extremely thin, high aspect ration platelets is well known and any of the known chemically delaminated vermiculite suspension may be used in the present invention. Processes for chemically delaminating vermiculite involve treating vermiculite with one or more aqueous solutions of metal or alkylammonium salts, swelling the resulting treated vermiculite in water and then applying shear to (e.g. by milling) the resulting swollen vermiculite in water to yield a suspension (or slurry) of vermiculite lamellae in water. Processes of this type are described, for example, in United Kingdom Patent Specifications Nos. 1,016,385; 1,119,305; 1,585,104 and 1,593,382 and in the U.S. Pat. Specification No. 4,130,687. Vermiculite lamellae produced by these processes are tiny platelets of thickness less than 1 micron (many of thickness less than 20 Angstroms) and of high aspect ratio of at least 10, preferably at least 100 and more preferably at least 1,000, e.g. 10,000.

In the known processes for chemically delaminating vermiculite, the cation of the metal or alkylammonium salt used to treat the vermiculite become associated with the vermiculite platelets. For this reason we prefer to employ organic cations, i.e. alkyl ammonium cations and especially n-butylammonium cations. However, such cations attract water and are undesirable in the coatings of the composite materials according to the invention. Therefore, after application of the vermiculite coating to the substrate (with or without a primer coating on the substrate), and drying thereof, we prefer to "cure" the coating composition by heating it at an elevated temperature which may be above 100° C. up to about 200° C. or even higher. We have found that coatings "cured" at about 130° C. are satisfactory in affording good water-barrier and gas-barrier properties.

Coating them with vermiculite composition in accordance with the invention upgrades the fire resistance and heat resistance of all polymeric substrates. However, the present invention finds particular importance in its application to thermoplastic polymeric materials which can be moulded or otherwise formed into shaped articles and heat-laminated with e.g. panels to afford a decorative facing for the panels. Composite materials according to the invention and comprising a thermoplastic polymeric substrate retain the ability of the substrate to be shaped or formed or heat-laminated to substrates and such composite materials are a preferred embodiment of the invention.

Any thermoplastic polymers material may form the substrate of the composite material, though particularly good results in terms of fire resistance and heat-resistance have been obtained where the polymeric material is or comprises a polyetherketone (especially a polyether ether ketone), a polysulphone (especially a polyether sulphone) or polyethylene terephthalate. Composite materials comprising one or more of these specified polymeric materials represent preferred specific embodiments of the invention.

Polyetherketones (PEK) are well known and are polymers comprising repeat units —Ar—CO—Ar—O— wherein the Ar groups are aromatic groups which may be the same or different but will usually be the same. Typically, the Ar group will be the phenylene group, Ph,($C_6H_4$) so that the repeating unit of the polymer is —Ph—CO—Ph—O—, the Ph group being the meta-phenylene group or the para-phenylene group. Polyether ether ketones are of the same general type —Ar—CO—Ar—O— but include additional ether (—O—) linkage so that they contain the repeat unit —Ar—CO—Ar—O—Ar—O—, typically —Ph—CO—Ph—O—Ph—O—. Polyether ether ketones and their preparation are described, for example in our U.S. Pat. No. 4,320,224 and the corresponding EPA 1879A.

Polyether sulphones (PES) are also known materials and comprise repeat units —Ar—$SO_2$—Ar—O—, where again Ar is an aromatic group, preferably the phenylene group, Ph, so that the repeat unit is —Ph—$SO_2$—Ph—O—. Polyether sulphones and their preparation are described, for example, in our U.S. Pat. Nos. 4,008,203; 4,008,204 and 4,008,205.

Polyethyleneterephthalate (PET) is a well-known polymeric material and is readily available in the form of sheets or films, for example under the trade name "Melinex" from Imperial Chemical Industries PLC.

The composite material according to the invention may be in the form of a coated sheet or film of the polymeric material substrate in which case the substrate may be coated with the vermiculite composition on one or both of its surfaces. Oriented films, for example biaxially oriented films, are preferred. Usually the sheet or film will be coated on both sides. Alternatively the composite material may be formed by coating with the vermiculite composition a sheet or film or panel of the polymeric material which has previously been heat-laminated to a substrate such as a wood, metal or foam building panel, e.g. as a decorative facing for the panel. In practice we prefer to coat the polymeric material sheet or film on one side only prior to laminating the uncoated side of the composite with another substrate as a decorative facing.

Application of the vermiculite coating composition to the polymeric material substrate can be effected by any convenient means such as immersion, brushing, spraying, dip-coating, roller-coating and doctoring. The viscosity and rheology of the coating composition is readily adjusted to meet the requirements of the particular application technique by means of viscosity-modifying agents and/or by adjusting the solids content, especially the vermiculite lamellae content, of the composition. As a guide only, the vermiculite content of the coating composition will usually be from about 5% to 10% for thin compositions suitable for spraying up to about 20% to 25% for viscous compositions suitable for application by doctoring or roller-coating. The invention is illustrated by the following examples.

EXAMPLE 1

An aqueous coating composition was prepared to the following formulation by blending the other ingredients into an aqueous suspension (15% w/w solids) of chemically delaminated vermiculite lamellae (produced using n-butylamine hydrochloride as the treating

| Ethylene/vinyl acetate copolymer [EN 428-from ICI] | 20 |
| Defoaming agent [Bevaloid] | 0.5 |
| Wetting agent [Manoxol OT] | 0.3 |

A sample of dimension 15 cm×15 cm of a polyether ether ketone film [PEEK-Stabar XK from ICI] was coated using a No. 4 Meyer bar with an aqueous primer coating composition of a copolymer of ethylene with vinyl acetate [EN 428]of 10% solids to provide a pick-up of the copolymer of 3 g/m$^2$. The primer coating was allowed to dry at room temperature. A coating of the vermiculite coating composition was then applied using a No.8 Meyer bar over the dry primer coating to provide a pick-up of solids of 25 g/m: and yield a coating of thickness about 20 microns. The coating was allowed to dry at room temperature and was then heated at 120° C. for 30 minutes.

Both sides of the polyether ether ketone film were coated by the above procedure.

The dry, coated film was evaluated in two fire tests:
A. UL94 Vertical Burning Test for classifying materials. 94 VTM Ratings—0, 1 or 2.

A cylindrical specimen is prepared from the film sample (8"×2") by wrapping longitudinally around a 0.5" diameter mandrel. The test is conducted in a draught free enclosure. The specimen is held vertically at the top and a standard bunsen flame is played centrally for 3 seconds at the bottom of the specimen. Underneath the specimen is a horizontal layer of dry absorbent surgical cotton which will ignite from any burning drips from the specimen. Duration of flaming, glowing of the specimen and burn distance after flame application as well as whether or not specimens drip flaming particles which ignite the cotton all serve to classify the material as VTM2, VTM1, or VTM0 which is considered the highest rating e.g. the least flammable.
B. ISO Oxygen Index (OI) Test.

This method describes a procedure for determining the relative flammability of plastics by measuring the minimum concentration of oxygen in a slowly rising mixture of oxygen and nitrogen that will just support combustion. Because the plastic film tends to be non self-supporting a special holder is used for retaining the sample.

For purposes of comparison, a sample of the uncoated polyether ether ketone film was also evaluated in the two fire tests.

In test A, UL94, the uncoated film achieved a rating of VTM-1. The coated film achieved a rating of VTM-0; thus the coating had upgraded the fire resistance of the film from a rating of 1 to the top rating of 0.

In test B,ISO 4589, the uncoated film was found to have an OI of about 23 while the OI of the coated film was 55, again signifying an appreciable upgrading of the fire-resistance of the film.

EXAMPLE 2

A sample of a polyether sulphone film (Stabar S from ICI) of thickness 100 microns was coated on both sides with a primer coating and a vermiculite coating as described in Example 1. The coated film was found to have an OI of 57 compared with an OI of about 25 for a sample of the uncoated film.

EXAMPLE 3

A sample of a biaxially oriented polyethylene terephthalate film ("Melinex" 505 from ICI) of thickness 125 microns was coated on both sides with a primer coating and a vermiculite coating as described in Example 1. The coated film had an OI of 63.7 compared with an OI of about 30 for the sample of uncoated film.

I claim:

1. A fire-resistant and heat-resistant composite material comprising a polymeric material substrate having thereon a coating comprising lamellae of chemically delaminated vermiculite and a copolymer of ethylene with a vinyl monomer.

2. A composite material as claimed in claim 1 which comprises a primer coating on the substrate of a copolymer of ethylene with a vinyl monomer.

3. A composite material as claimed in claim 1 or 2 wherein the vinyl monomer is vinyl acetate.

4. A composite material as claimed in claim 1 wherein the amount of the copolymer in the coating is from 2% to 30% by weight of the coating.

5. A composite material as claimed in claim 1 wherein the polymeric material substrate is a sheet or film.

6. A composite material as claimed in claim 5 wherein the coating has a thickness of about 20 microns.

7. A laminate comprising a facing layer of the composite material claimed in claim 1.

8. A method for the manufacture of a composite material which comprises applying to a polymeric material substrate a coating composition comprising lamellae of chemically delaminated vermiculite and a copolymer of ethylene with a vinyl monomer and drying the resulting coating.

9. A method as claimed in claim 8 wherein prior to application of the coating composition there is provided on the polymeric material substrate a primer coating of a copolymer of ethylene with a vinyl monomer.

10. A method as claimed in claim 8 or 9 wherein the vinyl monomer is vinyl acetate.

11. A method as claimed in claim 8 wherein after drying of the coating the composite material is heated at a temperature of up to 200° C. to cure the coating.

12. A method as claimed in claim 8 wherein the coating composition is an aqueous composition containing from 5% to 25% by weight of vermiculite lamellae.

* * * * *